(12) United States Patent
Hong et al.

(10) Patent No.: US 10,871,919 B2
(45) Date of Patent: Dec. 22, 2020

(54) MEMORY SYSTEM AND WEAR-LEVELING METHOD USING THE SAME

(71) Applicant: SK hynix Inc., Gyeonggi-do (KR)

(72) Inventors: Do-Sun Hong, Gyeonggi-do (KR); Dong-Gun Kim, Gyeonggi-do (KR); Yong-Ju Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/915,147

(22) Filed: Mar. 8, 2018

(65) Prior Publication Data

US 2018/0321878 A1 Nov. 8, 2018

(30) Foreign Application Priority Data

May 8, 2017 (KR) .......................... 10-2017-0057542

(51) Int. Cl.
*G06F 3/06* (2006.01)
*G06F 12/02* (2006.01)
*G06F 12/06* (2006.01)
*G06F 12/10* (2016.01)

(52) U.S. Cl.
CPC .......... *G06F 3/0659* (2013.01); *G06F 3/0616* (2013.01); *G06F 3/0631* (2013.01); *G06F 3/0644* (2013.01); *G06F 3/0679* (2013.01); *G06F 12/0246* (2013.01); *G06F 12/0607* (2013.01); *G06F 12/10* (2013.01); *G06F 2212/1036* (2013.01); *G06F 2212/202* (2013.01); *G06F 2212/657* (2013.01); *G06F 2212/7201* (2013.01); *G06F 2212/7205* (2013.01); *G06F 2212/7208* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 5,737,742 A * | 4/1998 | Achiwa | ................. | G06F 12/023 365/189.09 |
| 2011/0161553 A1* | 6/2011 | Saxena | ............... | G06F 12/0246 711/103 |
| 2013/0232289 A1* | 9/2013 | Zhong | ................. | G06F 12/0246 711/102 |
| 2015/0106551 A1* | 4/2015 | Kim | .................... | G06F 12/0246 711/103 |
| 2015/0331625 A1* | 11/2015 | Nishikubo | ............... | G06F 3/06 711/103 |
| 2015/0347292 A1* | 12/2015 | Fujita | .................. | G06F 12/0246 711/103 |

FOREIGN PATENT DOCUMENTS

KR 1020100037860 4/2010

* cited by examiner

*Primary Examiner* — Michael Alsip
(74) *Attorney, Agent, or Firm* — IP & T Group LLP

(57) ABSTRACT

A memory system may include a memory device comprising a plurality of memory banks, and a memory controller suitable for allocating data of successive logical addresses to the respective memory banks, and controlling read/write operations of the data, wherein the memory controller groups pages of the respective memory banks, and performs a wear-leveling operation based on the read/write operations of the data on each group of the pages.

19 Claims, 4 Drawing Sheets

MEMORY SYSTEM AND WEAR-LEVELING METHOD USING THE SAME

CROSS-REFERENCE TO RELATED APPLICATIONS

The present application claims priority of Korean Patent Application No. 10-2017-0057542, filed on May 8, 2017, which is incorporated herein by reference in its entirety.

BACKGROUND

1. Field

Various exemplary embodiments of the present invention relate to a memory system including a nonvolatile memory device, and more particularly, to a memory system that performs wear-leveling on a nonvolatile memory device, and an operation method thereof.

2. Description of the Related Art

Memory devices are roughly divided into volatile memory devices and nonvolatile memory devices.

The volatile memory device has a high write/read speed, but loses data stored therein when power supply is removed. The volatile memory device includes a Dynamic Random Access Memory (DRAM), Static RAM (SRAM), and the like. On the other hand, the nonvolatile memory device has a relatively low write/read speed, but retains data stored therein even though power supply is removed. Therefore, the nonvolatile memory device is used to store data which must be retained regardless of whether power is supplied. The nonvolatile memory device may include a Read Only Memory (ROM), Mask ROM (MROM), Programmable ROM (PROM), Erasable Programmable ROM (EPROM), Electrically Erasable Programmable ROM (EEPROM), flash memory, Phase Change Random Access Memory (PCRAM), Magnetoresistive RAM (MRAM), Resistive RAM (RRAM), and Ferroelectric RAM (FRAM).

Among the nonvolatile memory devices, the RRAM and the PCRAM have a limited write endurance. The write endurance may be defined as the number of write (i.e., program) cycles that can be applied to a memory block before storage media lose their reliability. The write endurance may be calculated by estimating how often the memory is used and how much the entire memory is used.

Therefore, when write operations are concentrated on a specific memory cell region, the lifetime of the memory device may be rapidly reduced. In order to prevent the concentration of write operations on a specific memory cell region, the memory device performs a wear-leveling operation such that the write operations can be evenly performed in the whole memory cell regions of the memory device. The wear-leveling operation is used to extend the write endurance of storage media. This technique is to evenly select memory cell regions as target regions of write operations to the storage media. Thus, while the repeated use of a specific memory cell region in the storage media is reduced, all the memory cell regions can be evenly used.

Typically, the wear-leveling operation is performed by a memory controller. For example, when a write request for the storage media is inputted, the memory controller calculates an overwrite count on a memory cell region corresponding to the write request. By changing mapping relation between logical addresses of data and physical addresses with reference to the overwrite count, the memory controller controls the storage media to perform a write operation on a region which is relatively less used among the memory cell regions.

In a memory system including a plurality of memory devices, the memory controller must effectively control the plurality of memory devices to process data at high speed. In order to effectively control the plurality of memory devices, the memory controller controls the memory devices in a parallel manner through, for example, an interleaving scheme. That is, the memory controller controls the plurality of memory devices in parallel to process data, and minimizes idle times of the respective memory devices.

When the above-described wear-leveling operations are scheduled in parallel among the plurality of memory devices, the performance of the memory system including the plurality of memory devices may be enhanced. The interleaving scheme may be achieved through mapping between the logical addresses of data requested from a host and the physical addresses of the memory devices, like the wear-leveling operations. Therefore, the memory controller needs to map the logical addresses of the data to the physical addresses such that such operations can be reflected.

SUMMARY

Various embodiments are directed to a memory system capable of performing a wear-leveling operation in parallel among a plurality of memory regions, and an operation method thereof.

In accordance with an embodiment of the present invention, a memory system includes: a memory device comprising a plurality of memory banks; and a memory controller suitable for, by allocating data of successive logical addresses to the respective memory banks, controlling read/write operations of the data, grouping pages of the respective memory banks, and performing wear-leveling according to the read/write operations of the data on a basis of each group of the pages.

In accordance with an embodiment of the present invention, an operation method of a memory system that reads/writes data from/to a memory device through an interleaving operation, the operation method comprising: grouping respective pages of a plurality of memory banks included in the memory device; checking read/write operations of the data on the groups; selecting one of the groups according to the result of the checking of the read/write operations; and performing a wear-leveling operation on the selected group.

In accordance with an embodiment of the present invention, a memory system includes: banks each including plurality of blocks and suitable for storing data; and a controller suitable for controlling the plurality of banks to perform a write operation of data having successive logical addresses on a page-by-page basis, wherein the controller sequentially maps the logical addresses to physical addresses of pages in the respective banks and sets the pages of the respective banks to memory blocks, and wherein the controller performs a wear-leveling operation to the memory blocks upon completion of the write operation.

DETAILED DESCRIPTION

Figure 1:
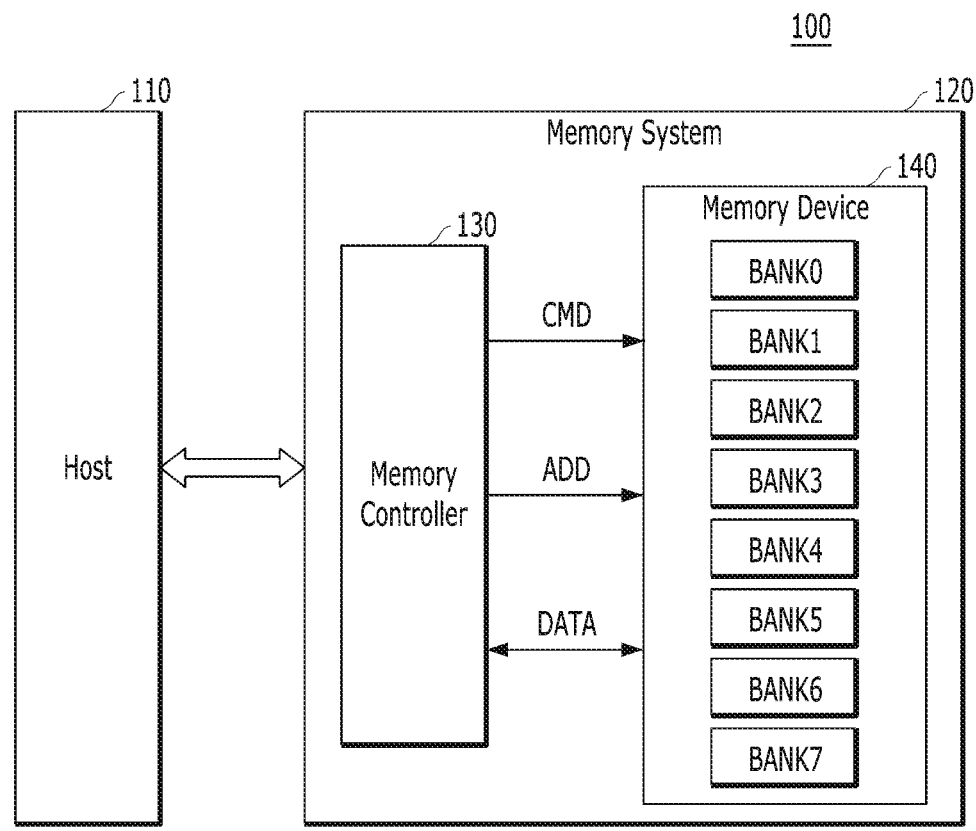
FIG. 1 is a diagram illustrating a data processing system including a memory system in accordance with an embodiment of the present disclosure.

Various exemplary embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a data processing system 100 including a memory system 120 in accordance with an embodiment of the present disclosure. Referring to FIG. 1, the data processing system 100 may further include a host 110.

The host 110 may include portable electronic devices such as a mobile phone and a MP3 player, or other electronic devices such as a laptop computer, desktop computer, game machine, TV, and beam projector.

The memory system 120 may operate in response to a request from the host 110. The memory system 120 may store data accessed by the host 110. That is, the memory system 120 may be used as a main memory unit or an auxiliary memory unit of the host 110. The memory system 120 may include a memory controller 130 and a memory device 140.

The memory controller 130 may control the memory device 140 in response to a request from the host 110. For example, the memory controller 130 may provide data DATA read from the memory device 140 to the host 110. For another example, the memory controller 130 may store data DATA provided from the host 110 into the memory device 140. For this operation, the memory controller 130 may transmit a command CMD and address ADD, as well as the data DATA to the memory device 140, and control a read or write (program) operation.

The memory device 140 may include a nonvolatile memory device having a plurality of memory cells. In accordance with the present embodiment, the memory device 140 may include a PCRAM. Although the present embodiment is not limited thereto, the memory device 140 may also include variable resistance memory devices such as an MRAM, PRAM, and FRAM. Alternatively, the memory device 140 may include a nonvolatile memory device such as a NAND or NOR flash memory.

The memory device 140 may include a plurality of banks BANK0 to BANK7. For convenience of description, FIG. 1 illustrates eight memory banks BANK0 to BANK7, but the present embodiment is not limited thereto. Although not illustrated, each of the memory devices BANK0 to BANK7 may include a plurality of pages divided by planes included in the memory device 140. The page may indicate a unit for dividing memory cells on which a read or write operation is performed, and the plane may indicate a unit for dividing memory cell blocks that share a page buffer.

Therefore, the memory controller 130 may control an interleaving operation among the memory banks BANK0 to BANK7 of the memory device 140. The memory controller 130 may access pages of the respective memory banks BANK0 to BANK7 in parallel, in order to process (read/write) data.

Figure 2:
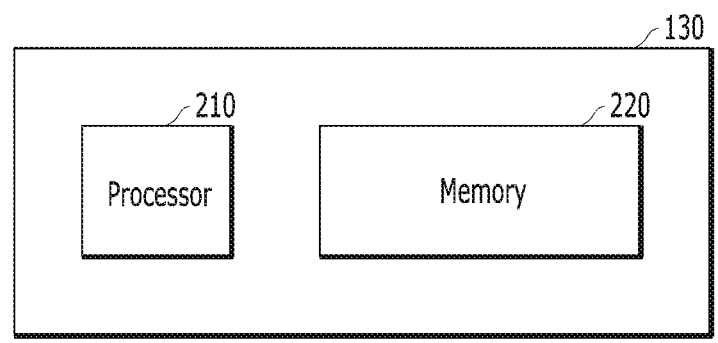
FIG. 2 is a block diagram illustrating a memory controller of FIG. 1.

FIG. 2 is a block diagram illustrating the memory controller 130 of FIG. 1. Referring to FIG. 2, the memory controller 130 may include a processor 210 and a memory 220. However, the components of the memory controller 130 are not limited thereto. For example, the memory controller 130 may further include a host interface, a memory interface, an error correction code (ECC) unit, and the like.

The processor 210 may include a microprocessor or CPU. The processor 210 may control overall operations of the memory controller 130. The processor 210 may drive firmware to control the overall operations of the memory controller 130. The firmware may be loaded to the memory 220 and then driven.

The memory 220 may serve as a working memory of the memory controller 130, and store data for driving the memory system 120. More specifically, the memory 220 may store firmware and data that are required for the memory controller 130 to perform a read or write operation of the memory device 140 in response to a request from the host 110.

The memory 220 may include a volatile memory. As described above, the memory 220 may not only store data required for performing various operations of the memory device 140, but also temporarily store data read/written between the host 110 and the memory device 140. For this storage operation, the memory 220 may include a program memory, a data memory, a write buffer/cache, a read buffer/cache, a map buffer/cache, and the like.

Figure 3:
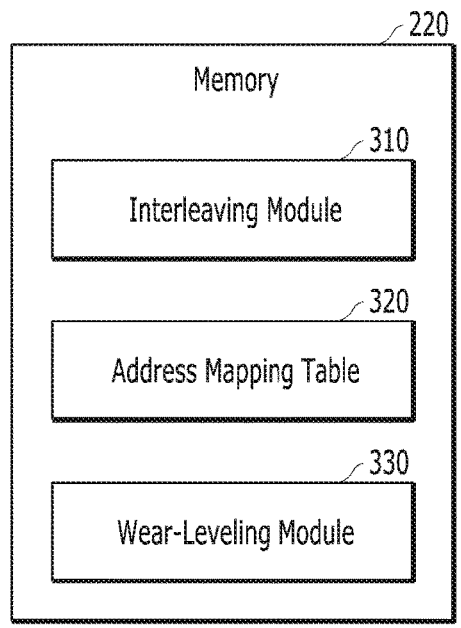
FIG. 3 is a block diagram illustrating a memory of FIG. 2.

FIG. 3 is a block diagram illustrating the memory 220 of FIG. 2. Referring to FIG. 3, the firmware loaded to the memory 220 may include a plurality of modules and management data.

In accordance with the present embodiment, the firmware may include an interleaving module 310, an address mapping table 320, and a wear-leveling module 330. However, the configurations of the memory 220 are not limited thereto. For example, the firmware may further include a bad block management module for managing a block including a defective memory cell, and a sudden power-off management module for preparing for an unexpected power-off.

The interleaving module 310 may perform an interleaving operation among the plurality of memory banks BANK0 to BANK7 of the memory device 140. The interleaving module 310 may manage data to be written in the memory device 140 through the interleaving operation. For example, the interleaving module 310 may divide the data to be written in the memory device 140 into predetermined sizes, and mix the divided data to reconfigure the divided data into interleaved data to be actually written in the memory device 140. The interleaving module 310 may write the interleaved data to the memory devices BANK0 to BANK7 of the memory device 140 in parallel.

When the host 110 accesses the memory system 120, the host 110 may provide a logical address of data. The memory controller 130 may convert the provided logical address into a physical address of the memory device 140, and perform a requested operation by referring to the physical address. For the address conversion operation, the firmware may include the address mapping table 320, and store or manage a conversion (mapping) relation between the logical address and the physical address.

Through the interleaving operation, the interleaving module 310 may allocate data of successive logical addresses to the respective memory banks BANK0 to BANK7 of the memory device 140, and control a read/write operation of the data. For this operation, the interleaving module 310 may sequentially map the logical addresses of the data to physical addresses of pages in the respective memory banks BANK0 to BANK7, and the mapping relations may be stored in the mapping table 320. Therefore, the memory controller 130 may process the data in parallel among the memory banks BANK0 to BANK7 of the memory device 140 through the interleaving operation.

The wear-leveling module 330 may manage the wear-levels of the memory cells constituting the memory device 140. When the memory device 140 includes a variable resistance memory device, the memory device 140 may support data overwrite. In other words, the memory cells of the memory device 140 may be aged by write operations, and the aged memory cells, that is, worn memory cells may cause a defect (for example, physical defect).

Therefore, the wear-leveling module 330 may perform a wear-leveling operation to the memory device 140 by a unit of a write operation or according to a scheme of a write operation. In accordance with an embodiment, data may be processed in an interleaving manner among the plurality of memory banks BANK0 to BANK7 of the memory device 140. Thus, the wear-leveling module 330 may also perform a wear-leveling operation in an interleaving manner among the plurality of memory banks BANK0 to BANK7.

For this operation, the wear-leveling module 330 may group pages of the respective memory banks BANK0 to BANK7. For example, when each of the memory banks BANK0 to BANK7 includes N pages where N is a natural number, the Kth pages of the respective memory banks BANK0 to BANK7 may be grouped to form a Kth group where K is a natural number smaller than N. The wear-leveling module 330 may perform a wear-leveling operation according to a read/write operation of data on each of the page groups.

Figure 4:
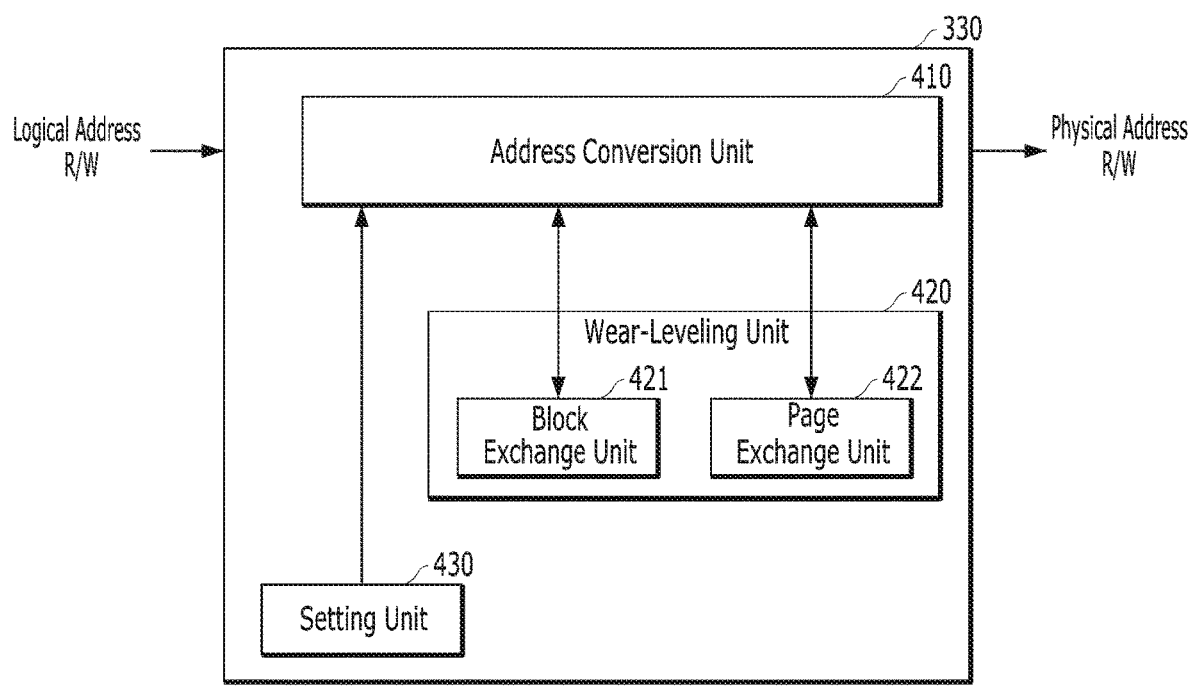
FIG. 4 is a block diagram illustrating a wear-leveling module of FIG. 3.

FIG. 4 is a block diagram illustrating the wear-leveling module 330 of FIG. 3. Referring to FIG. 4, the wear-leveling module 330 may include an address conversion unit 410, a wear-leveling unit 420, and a setting unit 430. FIG. 4 illustrates that the address conversion unit 410 is included in the wear-leveling module 330. However, the present disclosure is not limited thereto, and the address conversion unit 410 may be independently configured or shared by the interleaving module 310.

The address conversion unit 410 may map logical addresses of data inputted from the host 110 to physical addresses of the memory device 140. Through an interleaving operation, the address conversion unit 410 may sequentially map the logical addresses of the data to the physical addresses of pages of the respective memory banks BANK0 to BANK7. At this time, in order to perform wear-leveling on a basis of pages that are sequentially mapped, the address conversion unit 410 may group corresponding pages of the respective memory banks BANK0 to BANK7 as a memory block using the same physical block address. The address conversion unit 410 may store the mapping relation in the address mapping table 320, and convert logical addresses into physical addresses by referring to the address mapping table 320.

The wear-leveling unit 420 may check completion of write operations to memory blocks set by the address conversion unit 410, select one of the memory blocks according to the check result, and perform a wear-leveling operation to the selected memory blocks. The wear-leveling unit 420 may count the write operations of the data on the memory blocks, and compare the count to a reference count.

In response to a read/write command R/W, the wear-leveling unit 420 may increase the count of a target memory block of a write operation when the write operation is requested from the host 110. Furthermore, the wear-leveling unit 420 may compare the increased count to the reference count. At this time, when the increased count is equal to or more than the reference count or the count of the write operations is equal to or more than the reference count, the wear-leveling unit 420 may select the corresponding memory block as a target memory block of a wear-leveling operation.

Referring to FIG. 4, the wear-leveling unit 420 may include a block exchange unit 421 and a page exchange unit 422.

The block exchange unit 421 may exchange data of a selected memory block with data of another memory block, the selected memory block indicating a memory block of which the count is equal to or more than the reference count. At this time, another memory block may include a memory block to which write operations have never been counted or a memory block of which the count is relatively low.

At this time, the data exchanged through the wear-leveling operation may be processed in parallel among the memory banks BANK0 to BANK7 through an interleaving operation. The address conversion unit 410 may also remap the logical addresses of the data to the physical addresses through an interleaving operation. Through the remapping operation, the address conversion unit 410 may change the address mapping relation stored in the address mapping table 320. The data exchange or address remapping through the interleaving operation will be described in more detail with reference to an embodiment illustrated in FIG. 5.

The page exchange unit 422 may exchange the data of the pages included in the selected memory block or the memory block of which the count is equal to or more than the reference count. The page exchange unit 422 may exchange the data of all or part of the pages included in the selected memory block. At this time, the page exchange unit 422 may select arbitrary pages in the selected memory block. The block exchange unit 421 and the page exchange unit 422 may have different reference counts.

The setting unit 430 may store basic information for deciding a wear-leveling operation. For example, the setting unit 430 may set reference values of the wear-leveling operation, such as the number of memory banks included in the memory device 140, the number of pages in the respective page groups, and a number of bits of a physical block address. The setting unit 430 may set the reference counts of the block exchange unit 421 and the page exchange unit 422, and the address conversion unit 410 may map logical addresses of data to physical addresses of the memory device 140 by referring to the information set and stored by the setting unit 430.

Figure 5:
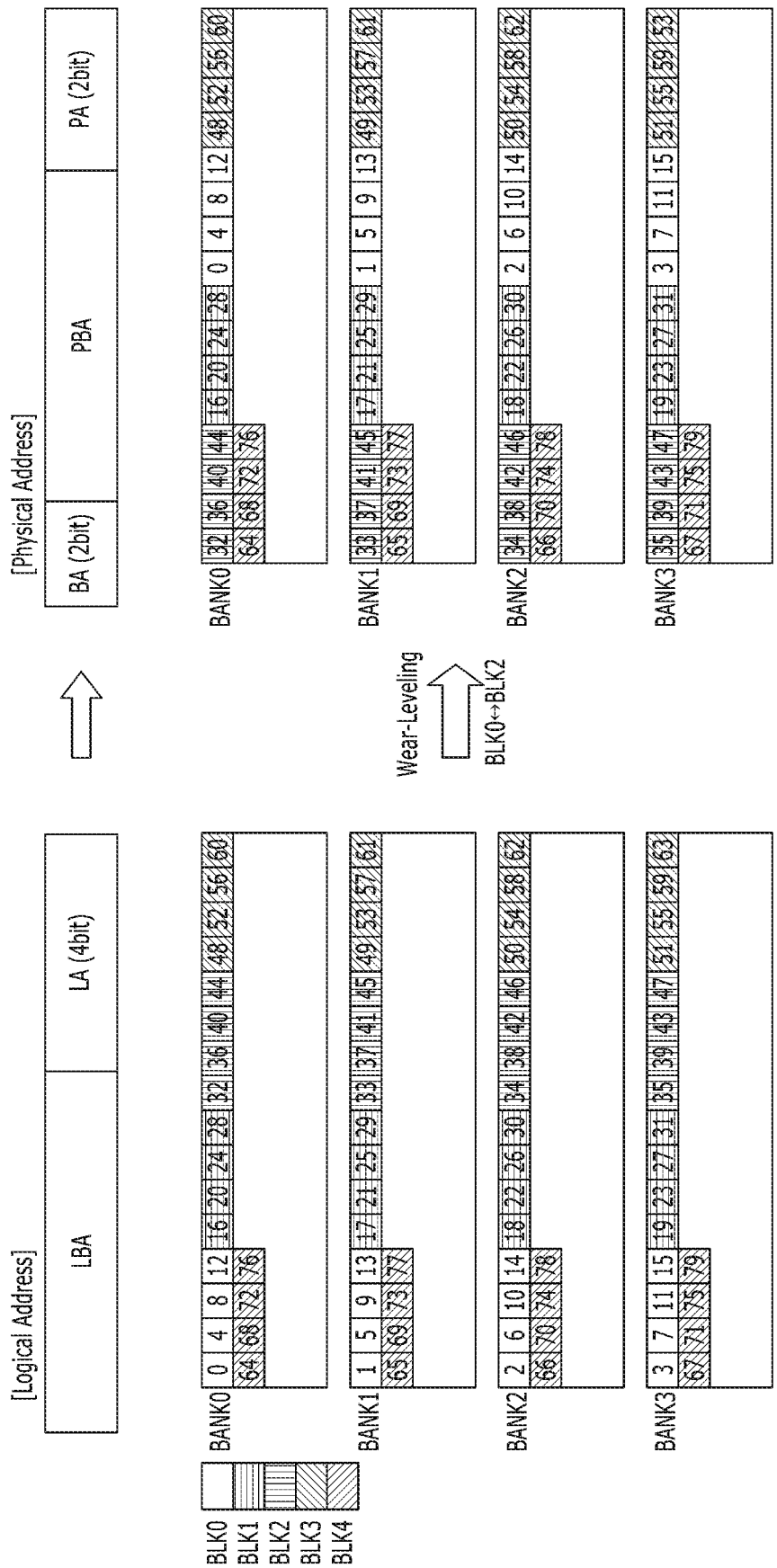
FIG. 5 is a diagram describing an operation of the wear-leveling module of FIG. 4.

FIG. 5 is a diagram describing the operation of the wear-leveling module 330 of FIG. 4.

The address conversion unit 410 may map a logical address inputted from the host 110 into a physical address of the memory device 140. At this time, the logical address may include a logical block address LBA and an internal address LA. The logical block address LBA may indicate a logical block of the corresponding data, and the internal address LA may indicate a location of a logical page in the logical block.

As described above, data may be allocated to the respective banks included in the memory device 140 and processed in parallel through the interleaving operation of the memory device 140. Therefore, the physical address of the memory device 140 may include a bank address indicating a memory bank to which data are allocated. FIG. 5 illustrates that the memory device 140 includes four memory banks BANK0 to BANK3. Thus, the bank address BA may include a 2-bit address.

The address conversion unit 410 may further allocate a physical block address PBA and an internal address PA, in order to indicate pages in which data are stored. The physical block address PBA may indicate a memory block including the pages, and the internal address PA may indicate a location of a page in the memory block. FIG. 5 illustrates that each of the memory blocks BLK0 to BLK4 in each of the respective memory banks BANK0 to BANK3 includes four pages. Therefore, the internal address PA may also include a 2-bit address. However, it is noted that the present embodiment is not limited thereto, and this configuration may be changed depending on an embodiment.

FIG. 5 illustrates that data of the first memory block BLK0 are exchanged with data of the third memory block BLK2 through a wear-leveling operation. Referring to FIG. 5, the wear-leveling operation in accordance with the present embodiment will be described in more detail. In FIG. 5, internal boxes of the respective memory banks BANK0 to BANK3 represent pages and numbers represented in the pages may indicate the logical addresses of data stored in the corresponding pages. That is, data of the logical addresses 0 to 79 may be sequentially stored in corresponding pages of the respective memory banks BANK0 to BANK3.

For this operation, the address conversion unit 410 may sequentially map the logical addresses of the data to the physical addresses of the corresponding pages of the respective memory banks BANK0 to BANK7. For example, the address conversion unit 410 may sequentially map the logical addresses 0 to 3 of the data to the physical addresses of the first pages of the respective memory banks BANK0 to BANK3. As illustrated in FIG. 5, when the Kth pages of the respective memory banks BANK0 to BANK3 are all mapped, the (K+1)th pages of the respective memory banks BANK0 to BANK3 may be sequentially mapped.

In order to perform the wear-leveling operation on a basis of pages which are sequentially mapped, the address conversion unit 410 may group corresponding pages of the respective memory banks BANK0 to BANK3 as the memory blocks BLK0 to BLK4 using the same physical block address. For example, FIG. 5 illustrates that the first four pages of the memory banks BANK0 to BANK3 are grouped to have the same physical block address of the first memory block BLK0. Also, FIG. 5 illustrates that the second four pages of the memory banks BANK0 to BANK3 are grouped to have the same physical block address of the second memory block BLK1.

Then, according to the wear-leveling operation, the wear-leveling unit 420 may count write operations to each of the memory blocks BLK0 to BLK4. The wear-leveling unit 420 may compare the count to the reference count, and select as a target memory block of a wear-leveling operation a memory block of which the count is equal to or more than the reference count, among the memory blocks BLK0 to BLK4.

The data of the selected memory block may be exchanged with data of another block of which the count is relatively low, among the memory blocks BLK0 to BLK4. For example, the data of the first memory block BLK0 may be exchanged with the data of the third memory block BLK2. At this time, the exchanged data may be processed in parallel among the memory banks BANK0 to BANK3 through the interleaving operation.

In the first memory bank BANK0, the data of the logical addresses 0, 4, 8, and 12 of the first memory block BLK0 may be exchanged with the data of the logical addresses 32, 36, 40, and 44 of the third memory block BLK2. Similarly, in the fourth memory bank BANK3, the data of the logical addresses 3, 7, 11, and 15 of the first memory block BLK0 may be exchanged with the data of the logical addresses 35, 39, 43, and 47 of the third memory block BLK2. As a result, the internal addresses PA as well as the bank addresses BA of the exchanged data may be maintained. Therefore, the address conversion unit 410 may exchange only the physical block addresses PBA corresponding to the first and third memory blocks BLK0 to BLK2, thereby completing address remapping through the interleaving operation.

Figure 6:
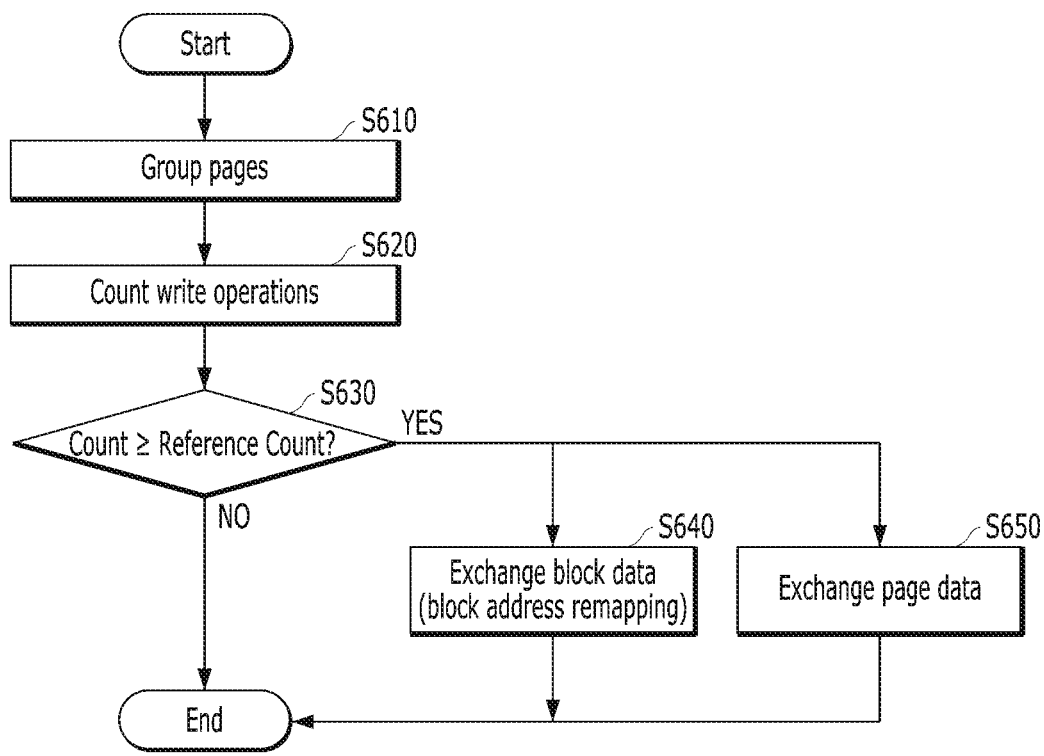
FIG. 6 is a flowchart illustrating a wear-leveling operation of a memory system in accordance with an embodiment of the present disclosure.

FIG. 6 is a flowchart illustrating the wear-leveling operation of the memory system 120 in accordance with the present embodiment.

Referring to FIG. 6, at step S610, the wear-leveling module 330 of the memory controller 130 may group the pages corresponding to the respective memory banks BANK0 to BANK7 included in the memory device 140, as exemplified in FIG. 1. As described above, the memory system 120 may read/write data from/to the memory device 140 through an interleaving operation. In other words, the address conversion unit 410 may sequentially map the logical addresses of the data to the physical addresses of the corresponding pages of the respective memory banks BANK0 to BANK7. Therefore, the data of the successive logical addresses may be allocated to the respective memory banks BANK0 to BANK7 and processed in parallel. In order to perform wear-leveling on a basis of pages which are sequentially mapped, the address conversion unit 410 may group corresponding pages of the respective memory banks BANK0 to BANK7 as memory blocks using the same physical block address.

At steps S620 and S630, the wear-leveling module 330 may check completion of read/write operations to the page groups. Specifically, the wear-leveling unit 420 may count write operations to the page groups or the memory blocks at step S620. When a write operation is requested from the host 110, the wear-leveling unit 420 may increase the count of a memory block corresponding to the requested write operation. Furthermore, the wear-leveling unit 420 may compare the count to the reference count at step S630. That is, when the count of the memory block is increased, the wear-leveling unit 420 may compare the increased count to the reference count.

According to the result of the read/write operation checking at steps S620 and S630, the wear-leveling module 330 may select one of the page groups as a target page group and perform wear-leveling operation to the selected page group at steps S640 and S650. That is, when the comparison result of the wear-leveling unit 420 indicates that the count is equal to or more than the reference count (YES at step S630), the wear-leveling unit 420 may select the corresponding memory block, and exchange data of the selected memory block with data of another memory block of which the count is relatively low, among the memory blocks, at step S640. At this time, the exchanged data may be processed in parallel among the memory banks BANK0 to BANK7 through an interleaving operation. Therefore, the address conversion unit 410 may perform remapping by exchanging only the physical block addresses of the exchanged data. In another embodiment, the wear-leveling unit 420 may exchange the data of the pages included in the selected memory block at step S650.

In accordance with the present embodiments, the wear-leveling operation may be performed in parallel among the plurality of memory regions included in the memory system. That is, read/write operations of data for the wear-leveling operation may be performed among the plurality of memory regions in an interleaving manner. For this operation, the memory system may set the unit of the wear-leveling operation across the plurality of memory regions, map the logical addresses of the data to physical addresses of the memory regions according to the set operation unit. Therefore, the memory system can reduce the data processing time required for the wear-leveling operation, and increase the wear-leveling performance.

Although various exemplary embodiments have been described for illustrative purposes, it will be apparent to those skilled in the art that various changes and modifications may be made without departing from the spirit and scope of the invention as defined in the following claims.

What is claimed is:

1. A memory system comprising:
a memory device comprising a plurality of memory banks, wherein each of the memory banks includes a plurality of pages; and
a memory controller suitable for, by allocating data of successive logical addresses to the respective memory banks and mapping the logical addresses of the data to physical addresses of allocated memory banks, controlling read/write operations of the data, setting a memory block by grouping Kth pages of the respective memory banks using a physical block address, and performing a wear-leveling operation by exchanging data of one group of the respective pages of the plurality of memory banks with data of another group of the respective pages of the plurality of memory banks based on the read/write operations of the data on the grouped Kth pages of the respective memory banks,
wherein the K is a natural number, and
wherein a physical block address of the one group of the respective pages of the plurality of memory banks is exchanged with a physical block address of the another group of the respective pages of the plurality of memory banks in conjunction with the data being exchanged from the one group to the another group.

2. The memory system of claim 1, wherein the memory controller sequentially maps the logical addresses of the data to the physical addresses of the corresponding pages of the respective memory banks, and controls the read/write operations of the data through an interleaving operation among the memory banks.

3. The memory system of claim 2, wherein the memory controller processes the data in parallel among the memory banks through the interleaving operation.

4. The memory system of claim 2, wherein the physical addresses each has a bank address, a physical block address, and an internal address.

5. The memory system of claim 2, wherein the memory controller comprises:
an address conversion unit suitable for mapping the logical addresses to the physical addresses and setting memory blocks;
a wear-leveling unit suitable for checking write operations of the data on the memory blocks, selecting one of the memory blocks according to the check result, and performing the wear-leveling operation on the selected memory block; and
a setting unit suitable for setting a reference value of the wear-leveling operation.

6. The memory system of claim 5, wherein the wear-leveling unit counts the write operations of the data on each of the memory blocks, and selects a memory block of which a count value is equal to or more than a reference value, among the memory blocks.

7. The memory system of claim 6, wherein the wear-leveling unit comprises a block exchange unit suitable for exchanging data of the selected memory block with data of another memory block of which a count value is relatively low, among the memory blocks.

8. The memory system of claim 7, wherein the exchanged data are processed in parallel among the memory banks through the interleaving operation.

9. The memory system of claim 7, wherein the address conversion unit remaps physical block addresses of the exchanged data.

10. The memory system of claim 6, wherein the wear-leveling unit comprises a page exchange unit suitable for exchanging data of pages included in the selected memory block.

11. An operation method of a memory system that reads/writes data from/to a memory device having a plurality of memory blocks through an interleaving operation, the operation method comprising:
setting a memory block by grouping Kth pages of the respective memory banks using a physical block address, wherein the K is a natural number;
controlling and checking read/write operations of the data on the groups by mapping logical addresses of the data to physical addresses of the groups;
selecting one of the groups according to the result of the checking of the read/write operations; and
performing a wear-leveling operation on the grouped Kth pages of the respective memory banks by exchanging data of the selected group of the respective pages of the plurality of memory banks with data of another group of the respective pages of the plurality of memory banks, wherein a physical block address of the one group of the respective pages of the plurality of memory banks is exchanged with a physical block address of the another group of the respective pages of the plurality of memory banks in conjunction with the data being exchanged from the one group to the another group.

12. The operation method of claim 11, the controlling and checking of read/write operations comprises sequentially mapping the logical addresses of the data to the physical addresses of the corresponding pages of the respective memory banks, and reading/writing the data through the interleaving operation.

13. The operation method of claim 12, wherein the checking of the read/write operations of the data on the groups comprises:
counting the write operations of the data on each of memory blocks; and
comparing count values to a reference value.

14. The operation method of claim 13, wherein the selecting of one of the groups and the performing of the wear-leveling operation comprises:
selecting a memory block of which a count value is equal to or more than the reference value, among the memory blocks, based on the result of the comparing; and exchanging data of the selected memory block with data of another memory block of which a count value is relatively low, among the memory blocks.

15. The operation method of claim 14, wherein the exchanged data are processed in parallel among the memory banks through the interleaving operation.

16. The operation method of claim 14, wherein the exchanging of the data of the selected memory block comprises remapping physical block addresses of the exchanged data.

17. The operation method of claim 13, wherein the selecting of one of the groups to the performing of the wear-leveling operation comprises:

selecting a memory block of which a count value is equal to or more than the reference value, among the memory blocks, based on the result of the comparing; and exchanging data of pages included in the selected memory block.

18. The operation method of claim 12, wherein data of successive logical addresses are allocated to the respective memory banks and processed in parallel, through the interleaving operation.

19. A memory system comprising:

banks each including plurality of blocks and suitable for storing data; and a controller suitable for controlling the plurality of banks to perform a write operation of data having successive logical addresses on a page-by-page basis, wherein the controller sequentially maps the logical addresses of the data to physical addresses of pages in the respective banks and sets Kth pages of the respective banks to a memory block using a physical block address, wherein the K is a natural number, and wherein the controller performs a wear-leveling operation on the Kth pages of the respective banks of the memory block upon completion of the write operation by exchanging data of one set of the respective pages of the plurality of memory banks with data of another set of the respective pages of the plurality of memory banks, wherein a physical block address of the one group of the respective pages of the plurality of memory banks is exchanged with a physical block address of the another group of the respective pages of the plurality of memory banks in conjunction with the data being exchanged from the one group to the another group.

* * * * *